(12) United States Patent
Yuan et al.

(10) Patent No.: US 10,540,422 B2
(45) Date of Patent: Jan. 21, 2020

(54) COMBINING MULTIPLE TRENDING MODELS FOR PHOTOVOLTAICS PLANT OUTPUT FORECASTING

(71) Applicant: Siemens Aktiengesellschaft, Munich (DE)

(72) Inventors: Chao Yuan, Plainsboro, NJ (US); Amit Chakraborty, East Windsor, NJ (US); Eberhard Ritzhaupt-Kleissl, Baiersdorf (DE); Holger Hackstein, Dietzenbach (DE)

(73) Assignee: Siemens Aktiengesellschaft, Munich (DE)

( * ) Notice: Subject to any disclaimer, the term of this patent is extended or adjusted under 35 U.S.C. 154(b) by 497 days.

(21) Appl. No.: 15/301,481

(22) PCT Filed: Apr. 14, 2014

(86) PCT No.: PCT/US2014/032986
§ 371 (c)(1),
(2) Date: Oct. 3, 2016

(87) PCT Pub. No.: WO2015/152941
PCT Pub. Date: Oct. 8, 2015

(65) Prior Publication Data
US 2017/0031867 A1 Feb. 2, 2017

(51) Int. Cl.
*G06F 17/18* (2006.01)
*G06N 20/00* (2019.01)
*G06Q 10/04* (2012.01)
*G06Q 50/06* (2012.01)

(52) U.S. Cl.
CPC .......... *G06F 17/18* (2013.01); *G06N 20/00* (2019.01); *G06Q 10/04* (2013.01); *G06Q 50/06* (2013.01)

(58) Field of Classification Search
CPC ........ G06F 17/18; G06N 20/00; G06Q 10/04; G06Q 50/06
USPC ........................................... 703/18
See application file for complete search history.

(56) References Cited

U.S. PATENT DOCUMENTS

2011/0276269 A1* 11/2011 Hummel ............... H02J 3/383
702/3

OTHER PUBLICATIONS

Yanting Li, "An ARMAX model for forecasting the power output of a gird connected photovoltaic system", 2013, Elsevier (Year: 2013).*
David Mackay, "Introduction to Gaussian Processes", 1998. Department of Physics Cambridge University (Year: 1998).*
International Search Report; Application No. PCT/US2014/032986; dated Apr. 4, 2014; 11 pages.

(Continued)

*Primary Examiner* — Kamini S Shah
*Assistant Examiner* — Faraj Ayoub (57) ABSTRACT

A method of predicting an amount of power that will be generated by a solar power plant at a future time includes: forecasting a value of a data variable at the future time that is likely to affect the ability of the solar power plant to produce electricity (S301); computing a plurality of features from prior observed amounts of power generated by the power plant during different previous durations (S302); determining a trending model from the computed features and the forecasted value (S303); and predicting the amount of power that will be generated by the power plant at the future time from the determined model (S304).

7 Claims, 4 Drawing Sheets

(56) References Cited

OTHER PUBLICATIONS

"An ARMAX model for forecasting the power output of a grid connected photovoltaic system", Renewable Energy, vol. 66,Dec. 20, 2013 (Dec. 20, 2013), pp. 78-89, XP028618475.
CHen Yang et al: "A novel ARX-based multi-scale spatio-temporal solar power forecast model", North American Power Symposium (NAPS). 2012, IEEE, Sep. 9, 2012 (Sep. 9, 2012), pp. 1-6, XP032257329 / Sep. 9, 2012.
Inman Rich H et al: "Solar forecasting methods for renewable energy integration", Progress in Energy and Combustion Science, vol. 39, No. 6,Jul. 26, 2013 (Jul. 26, 2013), pp. 535-576, XP028764771 / Jul. 26, 2013.
Mellit A et al: "Artificial intelligence techniques for photovoltaic applications: A review", Progress in Energy and Combustion Science, Elsevier Science Publishers, Amsterdam, NL, vol. 34, No. 5, Oct. 2008 (Oct. 2008), pp. 574-632, XP022931260 / May 10, 2008.
Pedro Ferreira et al: "A Neural Network Based Intelligent Predictive Sensor for Cloudiness, Solar Radiation and Air Temperature", Sensors, vol. 12, No. 12, Nov. 12, 2012 (Nov. 12, 2012), pp. 15750-15777, XP055157822 / Dec. 11, 2012.
Ricardo Marquez: "Solar Irradiance Forecasting at Multiple Time Horizons and Novel Methods to Evaluate Uncertainty", PhD Thesis, 2012, XP055157828.

\* cited by examiner

COMBINING MULTIPLE TRENDING MODELS FOR PHOTOVOLTAICS PLANT OUTPUT FORECASTING

BACKGROUND

1. Technical Field

The present disclosure generally to forecasting the solar power output of a photovoltaics plant, and more particularly to forecasting the solar power output of a photovoltaics plant by combining multiple trending models.

2. Discussion of Related Art

Integration of solar power into power grids has been receiving increasing interest in the energy industry, primarily because production of solar energy in some regions have a levelized cost of energy (LCoE) advantage as compared to traditional fossil energy. However, forecasting the solar power output of a photovoltaics (PV) plant is challenging, because solar power is subject to many uncertain environment and weather factors. For example, solar power generated on a sunny day can be quite different from that on a cloudy day. Therefore, improving accuracy in forecasting is of great importance for managing a power grid that includes solar power.

BRIEF SUMMARY

A method according to an exemplary embodiment of the invention is for predicting an amount of power that will be generated by a solar power plant at a future time. The method includes: forecasting a value of a data variable at the future time that is likely to affect the ability of the solar power plant to produce electricity; computing a plurality of features, where each feature is associated with a time period of a different duration and derived from prior observed amounts of power generated by the power plant during the corresponding duration; determining a model from the computed features and the forecasted value that indicates a trend in power output by the power plant over time; and predicting the amount of power that will be generated by the power plant at the future time from the determined model.

A method according to an exemplary embodiment of the invention is for predicting an amount of power that will be generated by a solar power plant at a future time. The method includes: forecasting a value of a data variable at the future time that is likely to affect the ability of the solar power plant to produce electricity; computing a plurality of features from prior observed amounts of power generated by the power plant during different previous durations; determining a trending model from the computed features and the forecast value; and predicting the amount of power that will be generated by the power plant at the future time from the determined model.

BRIEF DESCRIPTION OF THE SEVERAL VIEWS OF THE DRAWINGS

Exemplary embodiments of the disclosure can be understood in more detail from the following descriptions taken in conjunction with the accompanying drawings in which.

DETAILED DESCRIPTION

Exemplary embodiments of the invention are discussed in further detail with reference to FIGS. 1-4. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
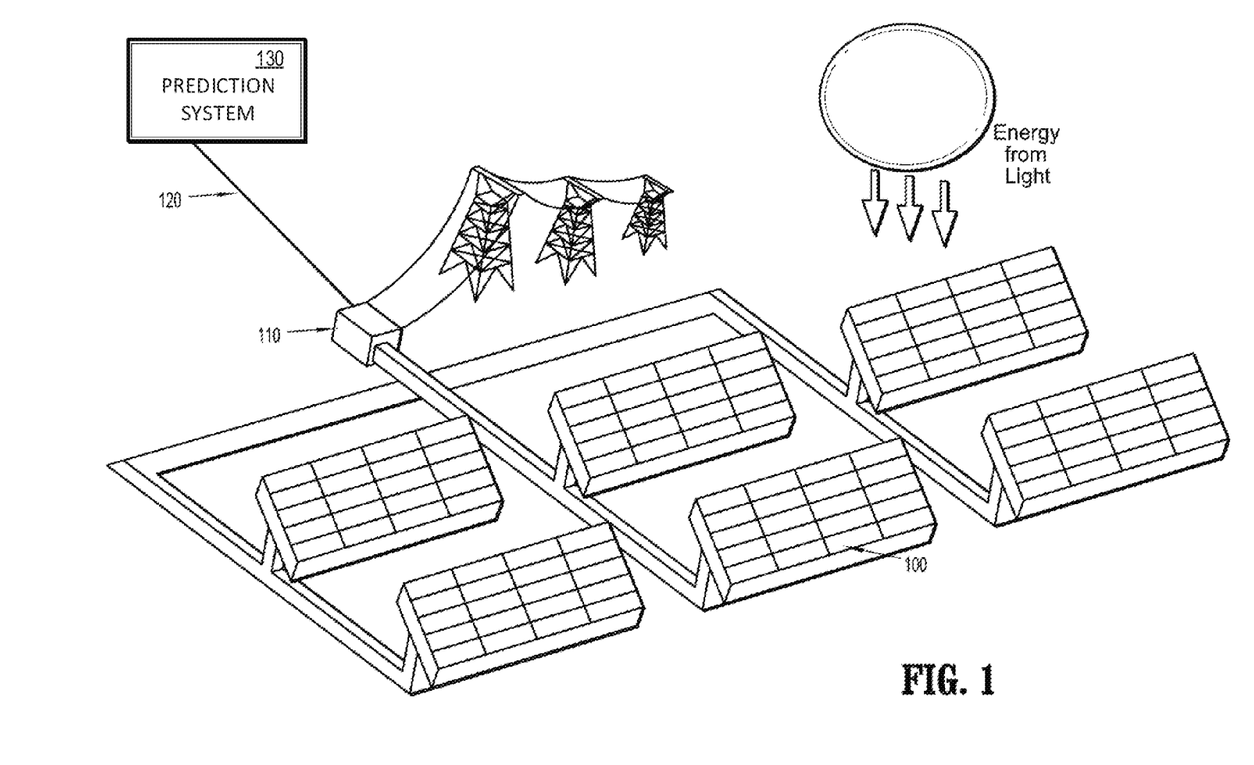
FIG. 1 illustrates a computer system capable of predicting a future amount of power that will be produced by solar panel devices of power plant, according an exemplary embodiment of the invention.

FIG. 1 illustrates solar panel devices 100, a control system 110, a network 120, and a prediction system 130 that can predict the amount of power that the plant 100 will generate/output at a given time in the future. The control system 110 may include a transformer to convert the electricity generated by the solar panel devices to a source of voltage that can be supplied to downstream customers. The control system 110 may include a meter that periodically measures the amount of power that is currently being generated by the solar panel devices 100. The meter may periodically transmit these measures across a network 120 to the prediction system 130. The meter may also store snapshots (e.g., every hour, every N number of minutes, etc.,) of the amount of power current being generated, and the prediction system 130 can periodically download as history data, some portion of these snapshots. The control system 110 and the prediction system may each include a transceiver and an antenna to communicate with one another wirelessly. The solar panel devices 100 may be part of a PV plant.

The power output of the PV plant at a current time t, where t=1, 2, 3, . . . N will be referred to herein as $o_t$. The current time t can have a resolution in minutes, hours, etc. The task of a PV power output forecasting is to predict the power $\tilde{o}_{t+h}$ at a horizon of h (e.g., at a future time) ahead based on data that is available. For example, if h is 1 hour, and the current time t is 12 pm, the task would be to predict the amount of power the plant is expected to generate at 1 pm. The prediction can be based on past observed power output up to time t. For example, at 9 am the plant could have generated 0.5 Terra watt (TW), at 10 am the plant could have generated 1 TW, at 11 am the plant could have generated 2 TW, and at 12 pm the plant could have generated 3 TW, etc. For tractability, only past data within a window w is relied on in the prediction. For example, if the window w is 2 hours, then the data for 9 am would be excluded and only the data from 10 am through 12 pm would be included in the prediction. This can be expressed in a regression function $f$ according to Equation 1 as follows:

$$\tilde{o}_{t+h} = f(o_t, o_{t-1}, \ldots, o_{t-w+1}, U_{t+h}). \quad (1)$$

Equation 1 includes another vector $U_{t+h}$, which can be referred to as an exogenous vector. The exogenous vector $U_{t+h}$ can contain or be based on other M time series data such as ambient temperature, humidity, cloud cover, etc. Since the exogenous vector $U_{t+h}$ refers to values in the future, they need to be forecasted before being used in Equation 1.

The exogenous variables of the vector $U_{t+h}$ may be predicted using numerical weather prediction (NWP) model(s) that are employed in weather forecasting. For example, one can also use computer vision technique(s) to predict cloud cover by analyzing sky or satellite images. The present disclosure will assume that the exogenous variables (e.g., the forecasted variables) is already available. For example, it could be assumed that at 1 pm, there is 80% cloud cover, its completely sunny, etc.

For conciseness, the term $o_{t-w+1:t}$ will be used to refer to $o_t, o_{t-1}, \ldots, o_{t-w+1}$. One can consider observed $U_{t-w+1:t}$ (exogenous variables that occurred in the past). For example, one can additionally consider the actual cloud cover that was observed at 10 am, 11 am, 12 pm, etc. However, because $o_{t+h}$ correlates with $U_{t+h}$ best, and extra forecasted values may introduce errors, at least one embodiment of the invention will only consider $U_{t+h}$ rather than both $U_{t+h}$ and $U_{t-w+1:t}$.

Persistence can be used to forecast the future power output of a PV plant. Persistence assumes that the amount of power output by a PV plant at a future horizon is the same as the amount of power it is currently outputting, as shown in Equation 2 as follows:

$$\tilde{o}_{t+h} = o_t. \quad (2)$$

An Autoregressive (AR) model assumes that function $f$ in Equation 1 has a linear form according to Equation 3 as follows:

$$\tilde{o}_{t+h} = \sum_{i=0}^{w-1} a_i o_{t-i} + b' u_{t+h}, \quad (3)$$

As shown in Equation 3, parameter $a_i$ and parameter $b=[b_1, b_2, \ldots, b_m]'$ are constant parameters (e.g., learned from training data), parameter M indicates that there are M exogenous variables, and parameter b' denotes the transpose of a matrix (vector) b. The AR model can be extended to the autoregressive moving average (ARMA) model and the autoregressive integrated moving average (ARIMA) models.

In a neural network (NN), function $f$ has hierarchical structuring having several layers with the first layer taking $o_{t-w+1:t}$ and $U_{t+h}$ as inputs, middle layers producing intermediate results and a final layer outputting the forecasted value $\tilde{o}_{t+h}$. For example, a time delayed neural network (TDNN) is one of the NNs that may be applied to solar power forecasting.

To improve the generalization capability of NNs, support vector machines (SVM) and a Gaussian process may be used. For a SVM and GP, $f$ is a linear combination of kernel functions. SVM and GP differ in the way of training. GP is a probabilistic model and is trained based on minimizing mean squared errors of training data, while SVMs are non-probabilistic and they are optimized by minimizing hinge loss of training data.

However, a single fixed window w may not be the best choice for a particular horizon h. Further, different forecasting horizons h may prefer different window w sizes. For example, to predict in a longer horizon h (with more uncertainty), you may need a larger window (with more information from history).

Further, if original observations are used directly, the noise and sudden changes presented in the signals reduce the accuracy of the prediction.

At least one embodiment of the invention uses trending information to improve the accuracy of the predicted power output by a PV plant at a future time (horizon).

In a method of predicting the power output by a PV plant at a future time, an exemplary embodiment of the invention considers a variety of window sizes w. Based on different forecasting horizons h and training data, a technique is used where different weights are assigned to different window sizes w such that they have different impacts on prediction. This technique can be used to generate a linear algorithm or a non-linear algorithm. For the linear algorithm, the weight may be identical to the combination coefficient. For the non-linear algorithm (GP), the weight is represented by the length scale of a GP.

In at least one embodiment of the invention, feature extraction is performed from a window w of original observations. A trending model is learned from this window of data. For example, if the power output is 1 TW at 10 am, 2 TW at 11 am, and 3 TW at 12 pm, a 1 TW increase per hour trending model could be learned. Then the power value at the given horizon (e.g., +1 hour) is predicted and used as a feature. The extracted feature is robust against noise and reflects the trending of the power signal. For example, the extracted feature could be a 1 TW increase per hour.

A trending function $g_w(t)$ is fit based on w data points $o_{t-w+1:t}$. The trending function $g_w(t)$ is fully determined by time t and window size w. For example, if the power output for a window of 3 hours is 2 TW for a first hour (e.g., 10 am), 4 TW for a second hour (e.g., 11 am), and 6 TW for a third hour (e.g., 12 pm), this would fit a trending function $g_w(t)=2t$. For example, if the power output for a window of 3 hours is 1 TW for a first hour, 4 TW for a second hour, and 9 TW for a third hour, this would fit a trending function $g_w(t)=t^2$. The trending function $g_w(t)$ can have any proper form such as a neural network or a polynomial function. The only requirement is that it should describe the evolving trend of the signal well. Therefore, one would like the trending function $g_w(t)$ to be as close as possible to each of the observations $o_{t-w+1:t}$ so that the fit is good as shown in Equation 4 as follows:

$$\begin{bmatrix} o_t \\ o_{t-1} \\ \ldots \\ o_{t-w+1} \end{bmatrix} \approx \begin{bmatrix} g_w(t) \\ g_w(t-1) \\ \ldots \\ g_w(t-w+1) \end{bmatrix}. \quad (4)$$

In at least one embodiment of the invention, a $d^{th}$ order polynomial function is chosen for $g_w(t)$ as shown in Equation 5 because it can extrapolate into the future well.

$$g_w(t) = \sum_{i=0}^{d} c_i t^i. \quad (5)$$

Based on Equation 5, Equation 4 can now be written as the following Equation 6.

$$\underbrace{\begin{bmatrix} o_t \\ o_{t-1} \\ \cdots \\ o_{t-w+1} \end{bmatrix}}_{o} \approx \begin{bmatrix} g_w(t) \\ g_w(t-1) \\ \cdots \\ g_w(t-w+1) \end{bmatrix} = \quad (6)$$

$$\underbrace{\begin{bmatrix} t^d & \cdots & t^1 & 1 \\ (t-1)^d & \cdots & (t-1)^1 & 1 \\ \cdots & \cdots & \cdots & \cdots \\ (t-w+1)^d & \cdots & (t-w+1)^1 & 1 \end{bmatrix}}_{T} \underbrace{\begin{bmatrix} c_d \\ c_{d-1} \\ \cdots \\ c_0 \end{bmatrix}}_{c}.$$

The coefficients $c_i$ or (vector c) of $g_w(t)$ may be determined by a least square method shown in Equation 7 below.

$$c = (T'T)^{-1} T'o. \quad (7)$$

Because $g_w(t)$ is trained to fit $o_{t-w+1:t}$ well, it is expected to give a reasonable prediction at $g_w(t+h)$ for $\tilde{o}_{t+h}$. Equation 8 shows an example of $g_w(t+h)$.

$$g_w(t+h) = \sum_{i=0}^{d} c_i (t+h)^i. \quad (8)$$

Higher order polynomials can be used, but linear functions may perform better. Therefore, in at least one embodiment of the invention, d is set to 1. An example of a linear function could be, for example, 5t+7, 2.5t-4, etc.

For a single trending model, a feature (e.g., a forecasted value) $g_w(t+h)$ is extracted where window size and horizon are fixed, based on past observations $o_{t-w+1:t}$ within the given window w.

While a single trending model $g_w(t)$ has been generated, and corresponding feature $g_w(t+h)$ has been extracted, this may not be sufficient to predict $\tilde{o}_{t+h}$. Therefore, at least one embodiment of the invention considers K such models (K is greater than 1), each with a different window size $w_k$, and linearly combines them with the exogenous vector according to Equation 9 as follows.

$$\tilde{o}_{t+h} = \left( \sum_{k=1}^{K} a_{w_k} g_{w_k}(t+h) \right) + b' u_{t+h}, \quad (9)$$

where $a_{w_k}$ and b are constants. A large $w_k$ captures trending of a longer range while a small $w_k$ represents variations in a short range. Different horizons h may prefer different window sizes and this requires different $a_{w_k}$ and b.

There are several ways to learn $a_{w_k}$ and b from training data. In a first approach, one can use a least squares method as was done to learn c. In a second approach, one can add constraints such that all $a_{w_k}$ and $b_m$ are confined between 0 and 1, as shown in equation 10.

$$\begin{cases} \sum_{k=1}^{K} a_{w_k} + \sum_{m=1}^{M} b_m = 1 \\ a_{w_k} \geq 0 \text{ for } k = 1, 2, \ldots, K \\ b_m \geq 0 \text{ for } m = 1, 2, \ldots, M \end{cases}. \quad (10)$$

In a third approach, one can add another objective to minimize the L1-Norm of these constants as shown in Equation 11.

$$\text{Min} \sum_{k=1}^{K} |a_{w_k}| + \sum_{m=1}^{M} |b_m|. \quad (11)$$

After training, many constants become zero and thus this third approach can be viewed as a feature selection method. At least one embodiment of the invention adopts the second approach.

Instead of using a linear form as in Equation [9], an alternate embodiment of the invention uses a Gaussian process (GP) with all $g_{w_k}(t+h)$ and $U_{t+h}$ as inputs. Therefore, the input to the GP has K+M variables (K features and M exogenous variables). In at least one embodiment of the invention, a GP with automatic relevance determination is used such that all these K+M inputs are assigned weight nonlinearly automatically via the length scale parameters of the GP.

Figure 2:
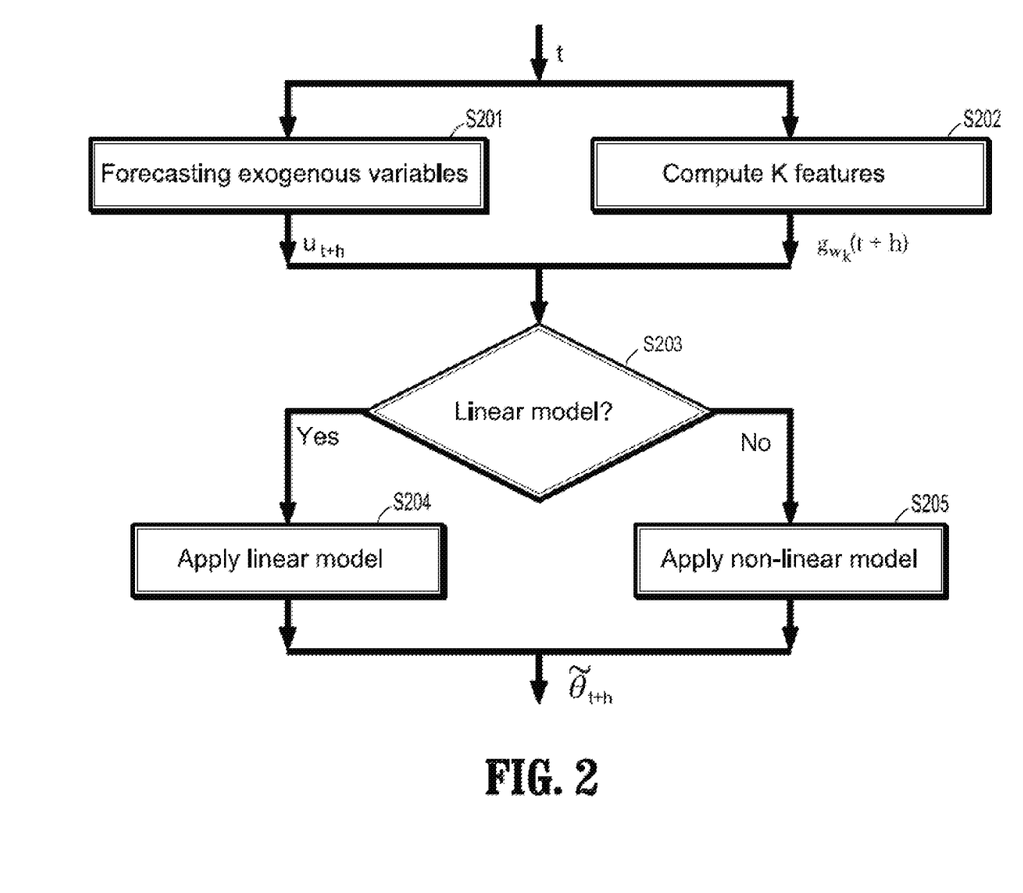
FIG. 2 illustrates a method predicting a future amount of power that will be produced by a PV power plant according to an exemplary embodiment of the invention, which may be used in the computer system of FIG. 1.

FIG. 2 shows a high level method for predicting the power generated by a PV plant according to an exemplary embodiment of the invention. Referring to FIG. 2, the method includes: forecasting the exogenous variables ($U_{t+h}$) (S201) and computing K features (S202). For example, the exogenous variables may be one or more data (e.g., cloud cover, temperature, etc.) that are predicted to occur at a time in the future (at a horizon h time), and which are likely to have some impact on the ability of the PV plant to produce electricity. For example, some of the exogenous data could make the PV plant produce more electricity (e.g., a completely sunny day, a very hot day), while other exogenous data could make the PV plant produce less electricity (e.g., a cloudy day).

Each of the K features may correspond or be based on a different function $g_{w_k}(t+h)$, that was fitted using data from windows of differing sizes. The step of forecasting the exogenous variables may occur before, after, or at the same time as the step of computing the K features.

The method next includes determining the type of model desired (S203). If it is determined that a linear model is desired, a linear model is applied (S204). For example, the K features ($g_{w_k}(t+h)$) may be linearly combined with the exogenous vector (variables) using Equation 9 to predict the future power output $\tilde{o}_{t+h}$ of the PV plant. If it is determined that linear model is not desired, a non-linear model is applied (S205). For example, the K features and the exogenous vector (variables) are input to a Gaussian Process (GP) with automatic relevance determination. The method of FIG. 2 may be modified to always apply the linear model, or to always apply the nonlinear model.

Figure 3:
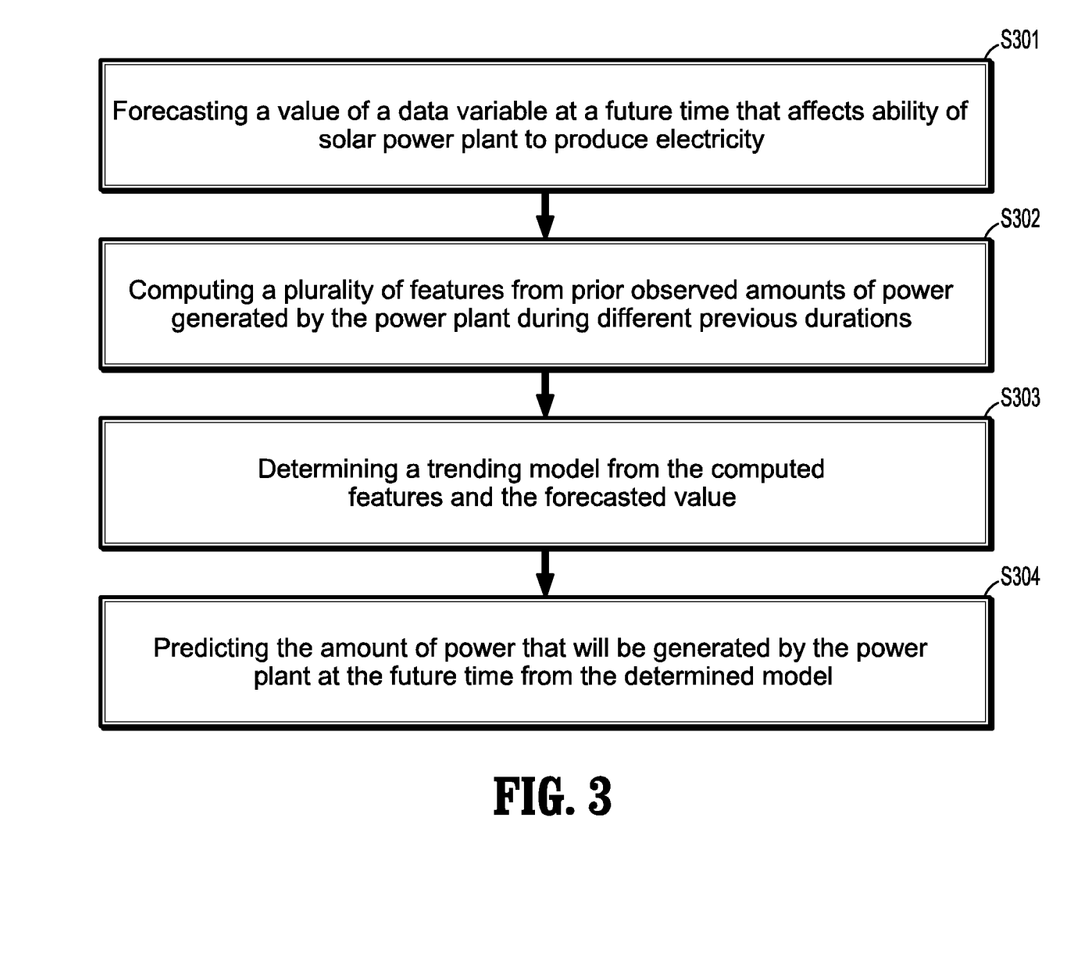
FIG. 3 illustrates a method predicting a future amount of power that will be produced by a PV power plant according to an exemplary embodiment of the invention, which may be used in the computer system of FIG. 1.

FIG. 3 illustrates a method according to an exemplary embodiment of the invention for predicting an amount of power that will be generated by a solar power plant at a future time. The method of FIG. 3 includes forecasting a value of a data variable at the future time that is likely to affect the ability of the solar power plant to produce electricity (S301). For example, the data variable corresponds to one or more of the above-described exogenous data variables such as cloud cover, temperature, humidity, etc.

The method of FIG. 3 further includes computing a plurality of features from prior observed amounts of power generated by the power plant during different previous durations (S302). The features may be computed before, after, or at the same time the value of the data variable is forecasted. The different previous durations correspond to windows of different durations. For example, when two features are computed, one of the windows could be 3 hours and the other window could be 2 hours, and then the first feature is generated from the prior 3 hours of power generation data observed (e.g., by the meter) for the power plant and the second feature is generated from the prior 2 hours of power data observed. Each computed feature may correspond to a different polynomial that best fits the data observed during its corresponding window.

The method of FIG. 3 next includes determining a trending model from the computed features and the forecasted value (S303). For example, the trending can be either the above-described linear model or the non-linear model.

The method of FIG. 3 further includes predicting the amount of power that will be generated by the power plant at the future time from the determined model (S304).

As an example, assume that it is decided that two windows will be used, a first window of 3 hours for computing a first feature and a second window of 2 hours for computing a second feature. Further, assume that it was determined that a function of 2t best fits the power generation data observed over the prior 3 hours and that a function of 4t best fits the power generation data observed over the prior 2 hours. Further assume that an exogenous data variable indicates how cloudy the sky will be at the future time, and at the current level of cloudiness, the plant is predicted to produce 1 TW of power. Referring to Equation 9, further assume that a constant $a_1$ for the first function is 0.5, a constant $a_2$ for the second function is 0.5, and a constant b for the data variable is 0.6. Thus, based on Equation 9, if one needs to predict the amount of power produced at three hours in the future, the result=0.3*2(3)+0.7*4(3)+0.6(1)=10.8 TW.

Figure 4:
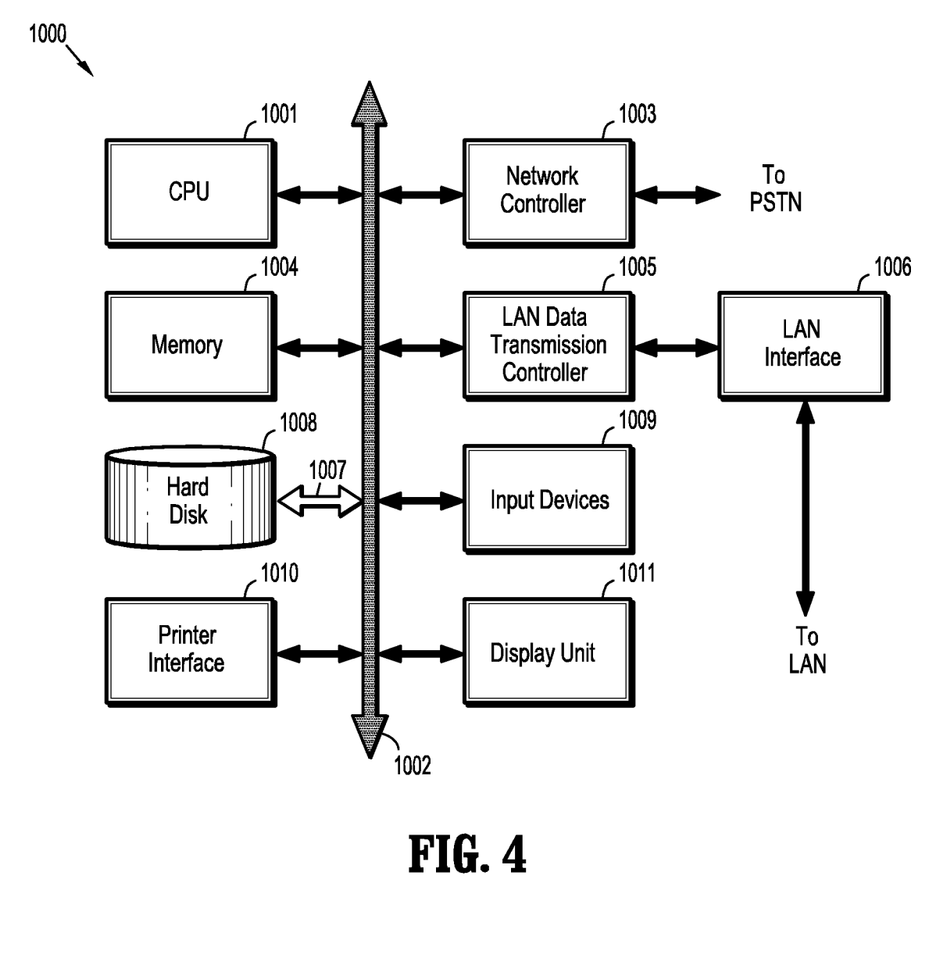
FIG. 4 shows an example of a computer system of FIG. 1.

FIG. 4 illustrates an example of the prediction system 130, which may execute any of the above-described methods according to exemplary embodiments of the disclosure. For example, the above-described methods of FIGS. 2-3 may be implemented in the form of a software application or computer program running on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The prediction system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007. For example, CPU 1001 may be the computer processor that performs the above described methods.

What is claimed is:

1. A process for forecasting power generation by a solar power plant using combined trending models, the process comprising:
   forecasting an exogenous vector of weather-related exogenous variables for a future time (h) that is likely to affect the ability of the solar power plant to produce electricity;
   generating a plurality of trending models representative of different trending ranges of prior data observations, each trending model generation comprising:
      extracting a feature from a trending function, wherein the extracted feature represents a power value at the future time (h) based on the trending function; wherein the trending function is associated with a time period (w) of a duration different than other trending functions and derived from prior observed amounts of power generated by the solar power plant during a corresponding time period (w);
   predicting an amount of power that will be generated by the solar power plant at the future time (h) from a combination of the trending models, wherein the combination is selectively a linear combination or a non-linear combination; wherein
   on a condition that the linear combination is selected, combining the feature and the forecasted exogenous vector as a sum of:
      the forecasted exogenous vector multiplied by a first weighting coefficient vector, and
      a sum of the feature multiplied by a respective feature weighting coefficient, wherein the first weighting coefficient and the respective feature weighting coefficient are adjusted according to the trending range; and
   on a condition that the non-linear combination is selected, combining the feature and the forecasted exogenous vector using a Gaussian process that takes the feature and the forecasted exogenous vector as inputs, the Gaussian process having automatic relevance determination such that all the inputs are assigned a weight coefficient nonlinearly automatically via a length scale parameter of the Gaussian process.

2. The method of claim 1, wherein the data variable indicates at least one of: an amount of cloud cover, an ambient temperature, and an amount of humidity.

3. The method of claim 1, wherein the extracting of the feature comprises:
   selecting part of history data that occurs within the duration associated with the feature;
   determining a polynomial that best fits the selected part; and
   deriving the feature from the determined polynomial and the future time (h).

4. The method of claim 3, wherein a highest order power of the polynomial is one.

5. A computer program product for forecasting power generation by a solar power plant using combined trending models, the computer program product comprising a non-transitory computer readable storage medium having program instructions embodied therewith, the program instructions executable by a computer to perform a method comprising:
   forecasting an exogenous vector of weather-related exogenous variables for a future time (h) that is likely to affect the ability of the solar power plant to produce electricity;

generating a plurality of trending models representative of different trending ranges of prior data observations, each trending model generation comprising:
extracting a feature from a trending function, wherein the extracted feature represents a power value at the future time (h) based on the trending function; wherein the trending function is associated with a time period (w) of a duration different than other trending functions and derived from prior observed amounts of power generated by the solar power plant during a corresponding time period (w);
predicting an amount of power that will be generated by the solar power plant at the future time (h) from a combination of the trending models, wherein the combination is selectively a linear combination or a non-linear combination; wherein
on a condition that the linear combination is selected, combining the feature and the forecasted exogenous vector as a sum of:
the forecasted exogenous vector multiplied by a first weighting coefficient vector, and
a sum of the feature multiplied by a respective feature weighting coefficient, wherein the first weighting coefficient and the respective feature weighting coefficient are adjusted according to the trending ranges; and
on a condition that the non-linear combination is selected, combining the feature and the forecasted exogenous vector using a Gaussian process that takes the feature and the forecasted exogenous vector as inputs, the Gaussian process having automatic relevance determination such that all the inputs are assigned a weight coefficient nonlinearly automatically via a length scale parameter of the Gaussian process.

6. The computer product of claim 5, wherein the computing of the feature comprises:
selecting part of history data that occurs within the duration associated with the feature;
determining a polynomial that best fits the selected part; and
deriving the feature from the determined polynomial and the future time (h).

7. The computer product of claim 6, wherein a highest order power of the polynomial is one.

* * * * *